United States Patent [19]

Weber et al.

[11] Patent Number: 5,653,794
[45] Date of Patent: Aug. 5, 1997

[54] SILANE TREATED INORGANIC PIGMENTS

[75] Inventors: Leon Weber, Baltimore; Robert J. Kostelnik, Ellicott City, both of Md.; Charles Wheddon, Tetney, England

[73] Assignee: SCM Chemicals, Inc., Hunt Valley, Md.

[21] Appl. No.: 565,852

[22] Filed: Dec. 1, 1995

[51] Int. Cl.$^6$ .................................................. C09C 1/36
[52] U.S. Cl. ..................... 106/442; 106/444; 106/445; 106/446; 106/490; 106/421; 106/426; 106/435; 106/450; 106/452; 106/454; 106/459
[58] Field of Search .................................. 106/444, 445, 106/446, 490, 442, 421, 426, 435, 450, 452, 454, 459

[56] References Cited

U.S. PATENT DOCUMENTS

| | | | |
|---|---|---|---|
| 3,025,179 | 3/1962 | Holbein | 106/421 |
| 3,545,994 | 12/1970 | Lott, Jr. | 106/436 |
| 3,834,924 | 9/1974 | Grillo | 106/490 |
| 3,915,735 | 10/1975 | Moreland | 106/490 |
| 4,061,503 | 12/1977 | Berger et al. | 106/445 |
| 4,141,751 | 2/1979 | Moreland | 106/445 |
| 4,151,154 | 4/1979 | Berger | 523/203 |
| 4,209,430 | 6/1980 | Weber | 106/447 |
| 4,318,843 | 3/1982 | Köhler | 523/212 |
| 4,344,799 | 8/1982 | Köhler | 106/443 |
| 4,375,989 | 3/1983 | Makinen | 106/444 |
| 4,810,305 | 3/1989 | Braun et al. | 106/499 |
| 4,989,794 | 2/1991 | Askew et al. | 241/16 |
| 5,035,743 | 7/1991 | Burow et al. | 106/499 |
| 5,083,712 | 1/1992 | Askew et al. | 241/16 |
| 5,458,681 | 10/1995 | Hasegawa et al. | 106/490 |
| 5,482,547 | 1/1996 | Bugnon et al. | 106/493 |
| 5,501,732 | 3/1996 | Niedenzu et al. | 106/447 |
| 5,562,990 | 10/1996 | Tooley et al. | 106/442 |
| 5,584,921 | 12/1996 | Wagner et al. | 106/287.1 |

FOREIGN PATENT DOCUMENTS

| | | |
|---|---|---|
| 492223A | 7/1992 | European Pat. Off. . |
| 594802 | 11/1947 | United Kingdom . |
| 785393 | 10/1957 | United Kingdom . |
| 825404 | 12/1959 | United Kingdom . |
| 1154835 | 6/1969 | United Kingdom . |
| 1204323 | 9/1970 | United Kingdom . |
| WO23192 | 8/1995 | WIPO . |
| WO23193 | 8/1995 | WIPO . |

OTHER PUBLICATIONS

Ullmann's Encyclopedia of Industrial Chemistry, vol. A–24: Silicon Compounds, Inorganic to Stains, Microscopic; Editors B. Elvers, et al. 1993 no month.

Silicon Chemistry and Technology, Editors: Bayer AG, Leverkusen Th. Goldschmidt AG, et al. 1991 no month.

"The Analytical Chemistry of Silicones," Smith A.L., editor, *Chemical Analysis*, John Wiley & Sons, Inc.

Primary Examiner—Mark L. Bell
Assistant Examiner—Louis M. Troilo
Attorney, Agent, or Firm—Kalow, Springut & Bressler

[57] ABSTRACT

The present invention provides a process for the production of hydrophobic inorganic oxide products which comprises reacting the inorganic oxide particles with organohalosilanes, preferably organochlorosilanes, to produce hydrophobic organosilane coated inorganic oxides. It is preferred that the organohalosilane compounds be reacted with the inorganic oxide particles in an aqueous slurry. The inorganic oxide pigments prepared by the processes of this invention have essentially quantitative retention of the organosilanes and contain no adsorbed aldehydes on their surface. The by-products produced in the preferred embodiments of the invention are innocuous salts, which are environmentally safe and readily disposable.

20 Claims, No Drawings

SILANE TREATED INORGANIC PIGMENTS

BACKGROUND OF THE INVENTION

This invention relates to hydrophobic, surface modified, inorganic metal oxides, such as titanium dioxide ($TiO_2$), and an improved, environmentally safer method for their preparation. The inorganic metal oxides of this invention offer improved properties with respect to their use in plastics and other materials.

Titanium dioxide is the premier white pigment used for whitening, brightening and opacifying paper, paints and plastics. As normally produced, $TiO_2$ is a hydrophilic pigment, meaning that it is readily wet by water and not wet by hydrophobic materials like organic polymers. In order to permit $TiO_2$ pigments to be wet-out by and dispersed in organic polymers, the surface of the pigment must be modified, or made hydrophobic, so that the polymer will spread over the pigment's surface and good adhesion between the pigment and polymer will occur.

Prior art references teach the preparation of hydrophobic $TiO_2$ pigments by treatment with "non-reactive" organic substances, such as polydimethylsiloxanes (see Noll, Chemie and Technologie der Silicon; 2nd edition 1968, page 386 et seq.), polyorganosiloxanes (U.S. Pat. No. 4,810,305) and phosphorylated fatty acid derivatives (U.S. Pat. No. 4,209,430) (commercially available as Sylvakote K from Arizona Chemical Company). These prior art, non-reactive organic substances interact with the metal oxide's surface partially or completely through Van Der Waals forces and/or electrostatic interactions, which are comparatively weak forces. U.S. Pat. Nos. 4,061,503 and 4,151,154 disclose reactions of organosilanes with $TiO_2$ to produce hydrophobic $TiO_2$ pigments which enhance dispersibility in paints and plastics. In these latter two patents the $TiO_2$ surface is treated with a silane possessing at least two hydrolyzable groups bonded to silicon and an organic group containing a polyalkylene oxide group. The hydrolyzable groups are described and illustrated as alkoxy, such as methoxy and ethoxy. Patent publication WO 95/23193 discloses the organosilicon treatment of $TiO_2$ particles associated with fluoride ions and coated with alumina or alumina-silica. Again in this patent application, preferred silanes are those which contain alkoxy groups.

Thus, traditionally, organoalkoxysilanes have been used in the prior art for hydrophobizing inorganic pigments, such as $TiO_2$. For most effective utilization, these organoalkoxysilanes have been applied to the pigment surface by spraying directly onto the dry mineral in a suitable solids mixing apparatus, such as a Patterson Kelly Liquid-Solid Twin Shell Blender. Modifying a mineral's surface by adding an organoalkoxysilane to an aqueous slurry of a mineral is more difficult than spraying the silane onto a dry powder because the reaction of the silane with the pigment surface must be achieved before the silane reacts with other silane molecules to form oligomers and/or polymers, which may not react then with the pigment surface. U.S. Pat. No. 4,061,503 teaches that a $TiO_2$ pigment treated via a slurry procedure did not produce as positive results as $TiO_2$ pigment treated dry.

A major deficiency in the prior art procedures that use alkoxy silanes is the generation of volatile organic compounds, such as methanol or ethanol, during hydrolysis of the silanes according to the equation:

Producers of minerals treated with alkoxyorganosilanes are obligated to protect their workers and the environment by collecting and disposing of these volatile organic compounds, which can often be expensive and time-consuming. A further deficiency of utilizing alkoxyorganosilanes is that under conditions encountered during processing and finishing the treated pigments, a portion of the volatile alcohol can be converted to noxious aldehydes. For example, ethanol can be oxidized to acetaldehyde which can remain on the surface of the inorganic oxide and be subject to evolution during further processing of the inorganic oxide by the inorganic oxide producer or customer. Further, alkoxyorganosilanes are among the most expensive organic materials known for hydrophobizing pigment surfaces.

It has been discovered that the above disadvantages of the prior art and others can be overcome by the present invention.

SUMMARY OF THE INVENTION

The present invention provides a process for the production of hydrophobic inorganic oxide products which comprises reacting the inorganic oxide particles with organohalosilanes, preferably organochlorosilanes, to produce hydrophobic organosilane coated inorganic oxides. It is preferred that the organohalosilane compounds be reacted with the inorganic oxide particles in an aqueous slurry. The inorganic oxide pigments prepared by the processes of this invention have essentially quantitative retention of the organosilanes and contain no adsorbed aldehydes on their surface. The by-products produced in the preferred embodiments of the invention are innocuous salts, which are environmentally safe and readily disposable.

DETAILED DESCRIPTION OF THE INVENTION

This invention provides hydrophobic inorganic oxide products which are free of adsorbed aldehydes and other organic compounds. The products of the present invention are produced by a process which overcomes the environmental deficiencies of prior art processes while, unexpectedly, maintaining or improving upon the processibility characteristics (e.g., dispersibility properties add lacing resistance) of such products in plastics and other materials This section details the preferred embodiments of the subject invention. These embodiments are set forth to illustrate the invention, but are not to be construed as limiting. Since this disclosure is not a primer on the manufacture of inorganic oxide products or their treatment with organosilane compounds, basic concepts known to those skilled in the art have not been set forth in detail. Concepts such as choosing a proper solvent or material amount are readily determinable by those skilled in the art. Attention is directed to the appropriate texts and references known to those in the art for details regarding acceptable temperatures, solvents, curing agents, etc.

Operable inorganic oxides include those which have surface hydroxyls capable of condensing with reactive organohalosilanes or hydrolyzed organohalosilanes. Such inorganic oxides are represented by the rutile and anatase forms of titanium dioxide, kaolin and other clays, alumina, silica, aluminum trihydrate, zirconium oxide, zinc oxide, iron oxide, cadmium pigments, chromate pigments, chromium oxide pigments, glass fibers, glass flake, wollastonite and the like. Preferred are standard pigment-grade titanium dioxides, regardless of whether they have been obtained from titanium tetrachloride or from titanium sulfate.

The inorganic oxide being coated with the organohalosilane can be an untreated inorganic oxide or an inorganic oxide whose surface has been treated by deposition thereon of phosphate, alumina, silica, zirconia and the like, using procedures well known to practitioners in the field of inorganic oxide surface treatment.

Suitable organohalosilanes are represented by the formula

where R represents a nonhydrolyzable aliphatic, cycloaliphatic or aromatic group (including a saturated or unsaturated, branched or unbranched alkyl, aryl cycloalkyl or alkylaryl group) having at least 1 to 20 carbon atoms or a polyalkylene oxide group; X represents a halogen and n=1, 2 or 3.

For example, organochlorosilanes useful in this invention include butyltrichlorosilane, hexyltrichlorosilane, octyltrichlorosilane, octylmethyldichlorosilane, decyltrichlorosilane, dodecyltrichlorosilane, tridecyltrichlorosilane, dihexyldichlorosilane, dioctyldichlorosilane, octadecyltrichlorosilane and tributylchlorosilane. Preferred organochlorosilanes for use in the practice of the present invention have R groups with 4–10 carbons most preferred are those with 6–8 carbons. Hexyltrichlorosilane and octyltrichlorosilane are commercially and economically available and result in organosilane-coated inorganic oxide pigments that have excellent dispersibility properties in plastics, and (particularly in the case of hexyltrichlorosilane) produce pigmented plastics with excellent lacing resistance.

The organohalosilanes can be employed in the invention individually or as mixtures of two or more individual species. The organohalosilane weight content, based upon the weight of the silanized inorganic oxide, is typically about 0.1 to about 5.0%. For organochlorosilanes, the preferred weight content is about 0.1 to about 2% and most preferably about 0.5 to about 1.5%.

The reacting of the inorganic oxide particles with the organohalosilanes in accordance with the invention may be accomplished by any suitable method by which surface treatment agents, coupling agents and the like are supplied to particulate surfaces. Suitable methods include those known to practitioners in the field of surface treatment of inorganic oxides, including the methods described in the prior art with respect to the treatment of titanium dioxide pigment with organoalkoxysilanes (e.g., spraying the organohalosilanes onto the pigment or grinding the organohalosilanes and pigment in a fluid energy mill). Suitable methods also include those utilized for the treatment of materials such as silicic fillers with organohalosilicon compounds.

Since organohalosilanes, particularly organochlorosilanes, react vigorously with moisture and water, it would have been expected that these substances must be applied to the inorganic oxides using nonaqueous, organic media. Conventional wisdom would predict that if the organohalosilane was applied to inorganic oxides in an aqueous system, the organohalosilane would rapidly hydrolyze and form oligomers and polymers rather than react with hydroxyl groups on the inorganic oxide's surface.

Unexpectedly, it has been found that organohalosilanes can be made to react with the surface of inorganic oxides in aqueous suspension to render the inorganic oxide surface hydrophobic by providing sufficient mixing and curing. The reacting of the organohalosilanes with the inorganic oxides in an aqueous system is the most preferred embodiment for the practice of the present invention. Utilization of this embodiment provides additional benefits such as the easy disposal of the reaction's by-products which are formed as innocuous salts.

It is contemplated that this aspect of the invention regarding the reaction of organohalosilanes with inorganic oxides in an aqueous system may be useful in fields outside of the treatment of inorganic oxides. Materials (besides inorganic oxides) that are presently treated with organohalosilanes in nonaqueous, organic media may be suitable for treatment in aqueous systems in accordance with this disclosure. Such treatment procedures may provide benefits such as the easy disposal of by-products, as discussed above with respect to inorganic oxide treatment.

In a preferred embodiment of the invention, the organohalosilane is added to a stirred, aqueous slurry of the inorganic oxide at a solids level of about 50 to 500 grams inorganic oxide per liter of water, preferably at a solids level of 300 to 400 grams per liter, at an initial pH less than about 11, preferably less than about 7, most preferably between 2 and 6. The pH can be allowed to drift downward as the organohalosilane is added or can be maintained at a desired value by adding base concurrently with the organohalosilane. The organohalosilane can be added dropwise into the stirred slurry, pumped into the slurry or pumped into a slurry recirculation line or added by any other suitable method. The rate of organohalosilane addition is such that all of the organohalosilane is added in about 1 minute to about 3 hours or longer, with a preferred addition time of 5 minutes to 1 hour and a most preferred addition time of about 10 minutes to about 45 minutes. The temperature of the organohalosilane treatment can be any suitable treatment temperature up to approximately the boiling point of the water. Preferably the treatment temperature is between 25° and 90° C., and most preferably between 60° to 80° C.

Following treatment of the inorganic oxide, the slurry pH is adjusted to a desired value, typically between 2.0 and 8.0, using preferably sodium hydroxide, and the slurry is allowed to age with mixing for the time, preferably up to about 1 hour, required to assure equilibrium distribution of the components of the slurry.

Following aging, the pH of the the organosilane coated inorganic oxide is collected using filtration, centrifugation or any other suitable technique, washed to remove soluble impurities (such as by-product salt), dried and further processed into a finished product using techniques suitable for the specific inorganic oxide being processed.

The use of organohalosilanes avoids formation of volatile organic compounds, such as methanol and ethanol, which arise from the hydrolysis of traditional organoalkoxysilanes. The innocuous salts, such as sodium chloride, which result from treatment of inorganic oxides with organohalosilanes followed by neutralization, are easily disposed and do not pose a threat to the environment and health as do the volatile alcohols. In addition, the use of organohalosilanes eliminates the formation of noxious aldehydes which can form during inorganic oxide pigment processing. The noxious aldehydes can present an environmental hazard during pigment preparation and residues can present a threat during silanized pigment use in plastics applications.

The inorganic metal oxide pigments of this invention are unique in that they are not contaminated by potentially hazardous oxidized by-products of prior art processes, e.g., aldehydes. The hydrophobic inorganic oxide products of this invention offer processibility in polymer composites as least as good as pigments prepared according to prior art procedures; that is, the dispersibility of the products of the present invention in polymers is at least as good as prior art inorganic oxide pigments and the lacing resistance of the resulting polymer composites containing the products of the present invention is as good as prior art polymer composites. Representative polymers in which the products of the present invention may be used include, but are not limited to, polymers of ethylenically unsubstituted monomers, including polyethylene, polypropylene, polybutylene and copolymers of ethylene with alpha-olefins containing 4 to 12 carbon atoms or vinyl acetate; vinyl homopolymers, acrylic homopolymers and copolymers, polyamides, polycarbonates, polystyrenes, acrylonitrile-butadienestyrenes, polyethers and the like.

The following examples set forth preferred embodiments of the invention. These embodiments are merely illustrative and are not intended to, and should not be construed to, limit the claimed invention in any way.

EXAMPLES

Comparative examples 1–4 demonstrate that metal oxide pigments treated with organotriethoxysilanes of the prior art contain associated aldehydes while the pigments of the present invention do not.

Comparative Example 1

800 grams of neutral tone, chloride process, $TiO_2$ product containing about 1.3% $Al_2O_3$ and about 0.15% $P_2O_5$ were slurried with 800 grams deionized water using a Rockwell Drill Press equipped with a 3 inch Cowles blade, mixing at 2000 rpm. The slurry was transferred to a 2000 ml glass beaker, heated to 80°–85° C., and the slurry pH was adjusted from an initial pH of 5.9 to 4.5. While maintaining the slurry at about 80° C. and with rapid stirring, 8.0 grams of octyltriethoxysilane (Prosil 9206 from PCR, Incorporated) was added. The treated slurry was aged with rapid stirring for 30 minutes at 80°–85° C. followed by oven drying at 110° C. and micronization at 500° F. The micronized pigment was analyzed for acetaldehyde using gas chromatography/mass spectroscopy head space analysis at 150° C. The acetaldehyde evolved from the pigment is shown in Table 1.

Comparative Example 2

An octyltriethoxysilane treated pigment was prepared according to the method of example 1 except the pH of the slurry during silane treatment and aging was adjusted to 6.0. The micronized pigment was analyzed for acetaldehyde using gas chromatography/mass spectroscopy head space analysis at 150° C. The acetaldehyde evolved from the pigment is shown in Table 1.

Comparative Example 3

An octyltriethoxysilane treated pigment was prepared according to the method of example 1 except the pH of the slurry during silane treatment and aging was adjusted to 7.0. The micronized pigment was analyzed for acetaldehyde using gas chromatography/mass spectroscopy head space analysis at 150° C., The acetaldehyde evolved from the pigment is shown in Table 1.

Comparative Example 4

197.9 kilograms of a blue base chloride process $TiO_2$ rutile product was mixed with deionized water so that the final volume of the slurried product was 568.8 liters. The $TiO_2$ slurry was heated with continuous stirring to 60° C. Sufficient phosphoric acid was added to make the system acidic with a pH of 2.1. After a brief aging of 10 minutes, the pH of the slurry was adjusted with caustic to a pH of 5.0. Over a period of 6 minutes 2,137 grams of octyltrichlorosilane was added to the slurry and the pH of the system was adjusted to 6.0 with caustic. After approximately 90 minutes, the slurry was filtered, washed and dried in an oven. The dried octytrichlorosilane-treated $TiO_2$ was deagglomerated in a fluid energy mill with superheated steam at 240° C. The milled pigment was analyzed for acetaldehyde using gas chromatography/mass spectroscopy head space analysis at 150° C. The acetaldehyde evolved from a sample of this pigment is shown in Table 1.

TABLE 1

| Micrograms of Acetaldehyde Evolved at 150° C. per Gram of $TiO_2$ Pigment | |
|---|---|
| Example 1 (Prior Art) | 1.2 |
| Example 2 (Prior Art) | 1.5 |
| Example 3 (Prior Art) | 2.4 |
| Example 4 (This Invention) | 0.0 |

The data in Table 1 shows that the hydrophobic $TiO_2$ pigment product of this invention is clearly improved compared to pigments prepared using organotriethoxysilanes of the prior art. The pigment prepared according to this invention evolves no noxious acetaldehyde.

PREPARATION OF POLYETHYLENE CONCENTRATES/MASTERBATCHES

50% $TiO_2$:50% polyethylene concentrates were prepared using a Haake Rheocord 9000 Computer Controlled Torque Rheometer. 125 g of $TiO_2$ and 125 g of LDPE 722 manufactured by Dow Chemical Company were dry blended and added to the 75° C. preheated chamber with rotors running at 50 rpm. One minute after addition of the $TiO_2$/LDPE mixture, the chamber temperature was raised to 105° C. Frictional heat generated by the mixing process was allowed to drive the rate of incorporation of the $TiO_2$ into the LDPE until a steady state mixture was achieved.

75% $TiO_2$:25% polyethylene concentrates were prepared using a BR Banbury Mixer. The mixer was preheated to 150° C. While the rotors are turning, 313 grams of LDPE NA 209, manufactured by The Quantum Chemical Company, were added followed by 939 grams of $TiO_2$ which, in turn, was followed by the remaining 313 grams of LDPE NA 209. The ram was lowered and set to 50 psi. The point at which the two materials mix together and flux can be recognized by the ram bouncing up and down and an audible cracking sound. The material was allowed to mix for an additional 3 minutes after flux before opening the mixer and allowing the material to discharge. This material was then cut into ~1 inch pieces while hot. These pieces were then placed into a Cumberland Crusher to obtain finely granulated 75% concentrate samples.

The processibility of inorganic oxides into polymer composites can be judged by evaluating the performance of the inorganic oxide under four test conditions, namely, extruder screen dispersion, melt flow, energy to achieve steady state flux and high temperature stability or lacing performance. Each of these tests requires the use of a $TiO_2$/polymer concentrate of one of the types described above.

The extruder screen dispersion test measures how readily the $TiO_2$ disperses in a polymer, e.g. low density polyethylene. 400 grams of a 75% $TiO_2$ concentrate, prepared as described above, is extruded through a Killion 1" extruder, followed by 1500 grams of LDPE, manufactured by The Chevron Chemical Company. The extruder temperatures are set at 350° F. (zone 1), 350° F. (zone 2), 390° F. (zone 3), and a screen pack configuration of 100/400/200/100 mesh screens (from tip of extruder screw to exit point for extrudate) is used. After all of the material has extruded, the screen pack is removed, and the screens are stapled onto an extrusion card. The screens are visually examined under a low power microscope (15×) and assigned screen ratings using standards. A rating of 1 signifies "Best" and 5 "Worst."

The fusion energy, or total torque required to achieve a steady state mixture of $TiO_2$ and polymer, under fixed process conditions, is also a good indicator of processability. Fusion energy measurements tabulated in Table 2 were obtained during production of 50 weight percent $TiO_2$ concentrates in low density polyethylene using the procedure described above. The total torque required to achieve the steady state mixture is readily obtainable during the production of the concentrates using the software supplied with the Torque Rheometer. Lower fusion energy values indicate that the $TiO_2$ is more readily incorporated into the polymer matrix.

The melt index is another measure, albeit rather rough, indicator of processability. Melt flows were measured according to ASTM method D1238-90b using 50% concentrates prepared according to the method described above. Higher melt indices imply easier processing.

Lacing is a measure of concentrate volatility at specific weight % pigment loadings and processing temperatures. Lacing tests were conducted on 50% $TiO_2$ concentrate samples prepared according to the method described above. The concentrates were conditioned for 48 hours at 23° C. and 50% relative humidity. The concentrates were then let down into LDPE 722 to achieve a 20% loading of $TiO_2$ in the final film.

Lacing evaluations were run on a 1" Killion extruder equipped with a slot die for fabricating cast films. A temperature profile of 343° C./die, 288° C./adaptor, 232° C./zone 3, 190° C./zone 2, 148° C./zone 1 was used. The screw speed was set at 90 rpm. A Killion 25.4 cm polished chrome chill roll was used to cool and transport the films and was set to maintain a 75 µm film thickness. The chill roll distance from the die lips was 22 mm and the temperature was ~27° C.

After the $TiO_2$/LDPE mix was placed in the hopper, the material was allowed to run until the appearance of white in the clear film was first noted. To ensure the concentration of $TiO_2$ in the film had stabilized, a two minute time interval was allowed before observations were recorded and a film sample taken. The extruder was then purged with LDPE until the film returned to clear.

Lacing performance was ranked by visual observations. Film samples were laid out on a dark surface and ranked according to the relative size and amount of holes. A 1.0–3.0 rating system was used. A rating of 1 was given to films with no lacing, 2 was given to films showing the onset of lacing, and 3 was given to films with extreme lacing. Increments of 0.1 were used to give some indication of relative performance between the samples.

Comparative examples 5–8 demonstrate that pigments prepared according to the teachings of this invention maintain equal or improved processability in polyethylene compared to prior art pigments. This is accomplished in conjunction with the reduced environmental threats of the present inventive process. The pigments of examples 5–8 were prepared in full scale production facilities. Comparisons are made realizing that many factors can influence variability in production processes. Statistical process control techniques were used to minimize variability in the production processes.

Comparative Example 5

Optimized, state-of-the-art production technology was used to prepare a hydrophobic $TiO_2$ pigment using polydimethysiloxane as a treatment for hydrophobizing the $TiO_2$. The pigment was tested in polyethylene for screen dispersion, energy required to mix with polyethylene, melt flow and lacing performance. The results are summarized in Table 2.

Comparative Example 6

Optimized, state-of-the-art production technology was used to prepare a hydrophobic $TiO_2$ pigment using Sylvacote K as a treatment for hydrophobizing the $TiO_2$. The pigment was tested in polyethylene for screen dispersion, energy required to mix with polyethylene, melt flow and lacing performance. The results are summarized in Table 2.

Comparative Example 7

Optimized, state-of-the-art production technology was used to prepare a hydrophobic $TiO_2$ pigment using octyltriethoxysilane as a treatment for hydrophobizing the $TiO_2$. The pigment was tested in polyethylene for screen dispersion, energy required to mix with polyethylene, melt flow and lacing performance. The results are summarized in Table 2.

Comparative Example 8

Optimized, state-of-the-art production technology was used to prepare a hydrophobic $TiO_2$ pigment using octyltrichlorosilane as a treatment for hydrophobizing the $TiO_2$. The pigment was tested in polyethylene for screen dispersion, energy required to mix with polyethylene, melt flow and lacing performance. The results are summarized in Table 2.

Comparative Example 9

Optimized, state-of-the-art production technology was used to prepare a hydrophobic $TiO_2$ pigment using hexyltrichlorosilane as a treatment for hydrophobizing the $TiO_2$. The pigment was tested in polyethylene for screen dispersion, energy required to mix with polyethylene, melt flow and lacing performance. The results are summarized in Table 2.

TABLE 2

Processibility Parameters of Hydrophobic $TiO_2$ Pigments

| | Screen Dispersion | Fusion Energy (m · Kg · M) | Melt Flow (g/10 min) | Lacing |
|---|---|---|---|---|
| Example 5 (prior art) | 2 | 15.4 | 5.5 | 2.0 |
| Example 6 (prior art) | 1 | 10.7 | 5.3 | 1.7 |
| Example 7 (prior art) | 1 | 14.3 | 5.2 | 1.6 |
| Example 8 | 1 | 10.2 | 5.7 | 1.6 |
| Example 9 | 1 | 14.0 | 5.7 | 1.1 |

The data in Table 2 shows that a $TiO_2$ pigment of this invention provides for processing in polyethylene at least as well as optimized TiO$_2$ pigments made according to prior art. This is accomplished in conjunction with the reduced environmental threats of the present inventive process.

Upon reading the subject application, various alternative constructions and embodiments will become obvious to those skilled in the art. These variations are to be considered within the scope and spirit of the subject invention. The subject invention is only to be limited by the claims which follow and their equivalents.

We claim:

1. A silanized inorganic oxide pigment containing no aldehydes on its surface.

2. The pigment of claim 1 in which the silanized inorganic oxide pigment is a titanium dioxide pigment.

3. A process for producing a silanized inorganic oxide pigment which comprises reacting an inorganic oxide with an organohalosilane represented by the formula $$R_nSiX_{4-n}$$

where R represents a nonhydrolyzable aliphatic, cycloaliphatic or aromatic group having at least 1 to 20 carbon atoms or a polyalkylene oxide group; X represents a halogen and n=1, 2 or 3.

4. The process of claim 3 in which the organohalosilane is an organochlorosilane.

5. The process of claim 4 in which the organochlorosilane is octyltrichlorosilane of hexyltrichlorosilane or mixtures thereof.

6. The process of claim 3 in which the inorganic oxide is titanium dioxide.

7. The process of claim 3 in which the inorganic oxide is selected from the group consisting of zinc oxide, aluminum oxide, silicon dioxide, zirconium oxide, lithipone, lead oxide, chromium oxide pigments, iron oxide pigments and cadmium pigments.

8. The process of claim 3 wherein the reacting step is effected by adding the organohalosilane to a stirred aqueous slurry of the inorganic oxide.

9. The process of claim 8 which further comprises adjusting the pH during the reacting step, aging the slurry, neutralizing any acid that may evolve, and recovering the reacted inorganic oxide.

10. The process accordingly to claim 8 in which the pH of the slurry is initially between 2 and 6.

11. The process according to claim 8 in which the organohalosilane is added in a time period between about 10 minutes and about 45 minutes.

12. The process according to claim 8 in which the temperature of the slurry is between 60° and 80° C.

13. The process according to claim 9 in which the pH during the aging of the slurry is between about 2 and about 7.

14. The process according to claim 9 in which the aging time is sufficient to assure equilibrium distribution of the components of the slurry.

15. The process according to claim 9 in which the slurry is neutralized to a pH of between about 6.0 to about 9.0.

16. The process according to claim 9 in which the oxide is wet ground or dry ground to a desired particle size following recovery.

17. A silanized inorganic oxide pigment produced by the process of claim 3.

18. A silanized inorganic oxide pigment produced by reacting an organochlorosilane with an inorganic oxide in an aqueous slurry.

19. A polymer composite containing the pigment of claim 1.

20. The process of claim 3, wherein the inorganic oxide is reacted with an organohalosilane or a mixture of two or more organohalosilanes independently represented by the formula $R_nSiX_{4-n}$ where R represents a nonhydrolyzable aliphatic, cycloaliphatic or aromatic group having 5–10 carbon atoms or a polyalkylene oxide group.

* * * * *